June 25, 1968   M. M. KNAPP ET AL   3,389,417
PIPELINE SWIPE
Filed Oct. 7, 1966
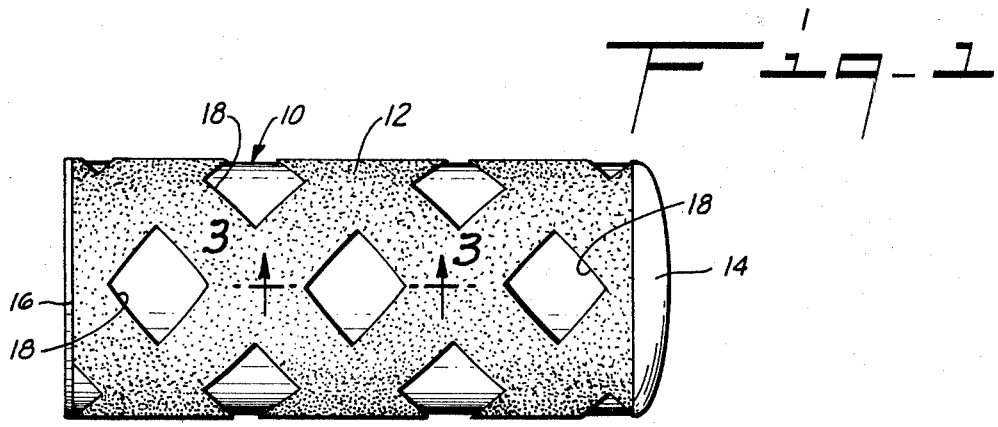
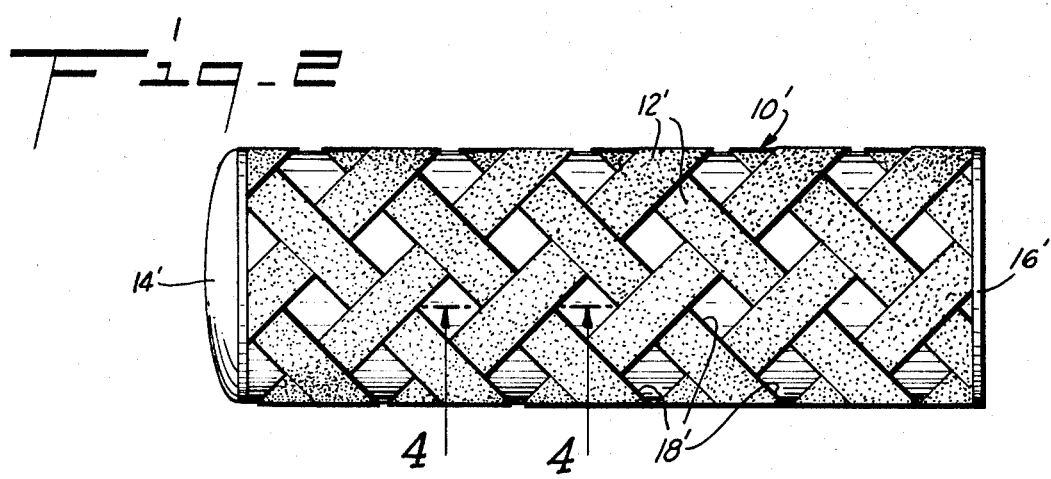
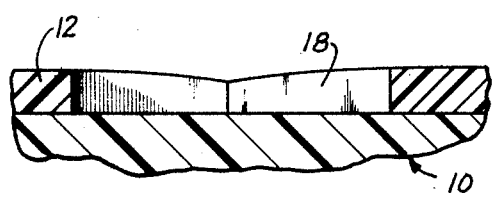
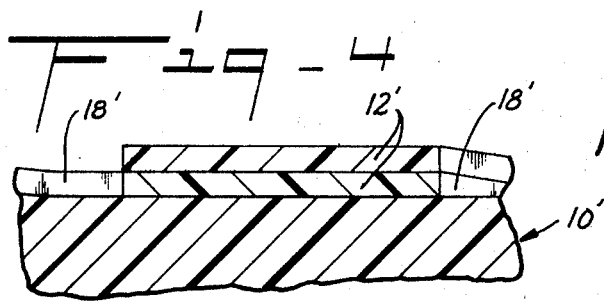
MARY M. KNAPP
HARRY J. GIRARD
INVENTOR.
BY
Charles E. Lightfoot
ATTORNEY

United States Patent Office 3,389,417
Patented June 25, 1968

3,389,417
PIPELINE SWIPE
Mary M. Knapp, 1209 Hardy St. 77020, and Harry J. Girard, 1947 W. Gray 77003, both of Houston, Tex.
Filed Oct. 7, 1966, Ser. No. 585,156
6 Claims. (Cl. 15—104.06)

This invention relates to a plug or swipe for use in pipelines for the purpose of cleaning the interior of the pipe or to maintain separate two fluids of different character being transmitted through such a line.

The invention is capable of wide application in connection with the use and maintenance of pipelines and finds particular utility in connection with plugs or swipes formed of resilient material which is spongy or cellular in character, such as those formed of plastic foam, such as foamed polyurethane or the like, which is both durable and uneffected by fluids of the kind usually transmitted through pipelines.

In the transmission of fluids through pipelines, as heretofore customarily practiced, such lines are often used for the transmission of fluids of widely different character, which it is necessary to maintain in a separated state, and for this purpose a plug or swipe is introduced into the pipe upon discontinuance of the flow of one such fluid and before the introduction into the line of another fluid of different character, which plug or swipe is of a type to form a seal between the two fluids and to be propelled through the line by a pressure gradient. Plugs or swipes of this kind are also frequently employed for the cleaning of pipelines by propelling the same through the line by a pressure gradient to wipe, scrape or abrade the internal surface of the pipe.

Such plugs or swipes, as heretofore commonly constructed are often damaged due to a variety of causes, such as irregularities in the pipe, roughness of the internal surface of the same, passing through bends, valves, restrictions, or fittings in the line, or from other causes, so that the swipes are torn or worn away, which may result in failure to form a tight seal with the surrounding wall of the pipe.

The present invention has for an important object the provision of a pipeline plug or swipe in the form of a body of flexible, resilient material having on its exterior a material which engages the wall of the pipe to prevent tearing or wearing away of the material of the body.

Another object of the invention is to provide a pipeline plug or swipe in the form of a body of flexible, resilient material, such as plastic foam, having an external coating or cover of durable, wear resistant material positioned for sealing engagement with the surrounding wall of the pipe and having openings or interstices through which the foam material may extend into contact with the pipe.

A further object of the invention is the provision in a pipeline plug or swipe formed of flexible resilient material of an external coating or cover for the same positioned for engagement with the surrounding wall of the pipe and having openings or interstices through which the resilient material may expand into contact with the pipe, the coating or cover being arranged to prevent the flow of fluid externally past the swipe.

Briefly described the plug or swipe of the invention comprises a body, preferably of generally cylindrical shape and somewhat elongated, formed of flexible, resilient material, such as rubber, plastic foam, or the like, and having an external coating or cover of flexible, wear resisting material positioned to form a seal between the body and the surrounding wall of the pipe entirely about the body while at the same time providing openings or interstices through which the material of the body may expand into contact with the pipe.

The above object and other obvious advantages of the invention will be apparent from the following detailed description, when considered with the annexed drawings, wherein:

FIGURE 1 is a side elevational view illustrating a preferred embodiment of the plug or swipe of the invention;

FIGURE 2 is a view similar to that of FIGURE 1, illustrating a somewhat modified form of the invention;

FIGURE 3 is a cross-sectional view, on a greatly enlarged scale, taken along the line 3—3 of FIGURE 1, looking in the direction indicated by the arrows; and FIGURE 4 is a cross-sectional view, on a greatly enlarged scale, taken along the line 4—4 of FIGURE 2, looking in the direction indicated by the arrows.

Referring now to the drawings in greater detail, the plug or swipe of the invention comprises a body, generally designated 10, formed of flexible, resilient material, such as rubber, plastic foam, or the like, which is preferably of somewhat elongated, cylindrical shape. While the material of which the body is formed may be any of numerous materials having the requisite characteristics of flexibility and resiliency for the purpose, it is preferred to form the body of a durable, easily expansible, cellular material such as foamed polyurethane.

The body 10 is provided with an external coating or cover 12, which is disposed for engagement with the surrounding wall of the pipe throughout the length and circumference of the body and which may also extend over the front and rear ends of the same as seen at 14 and 16. The coating or cover 12 may be formed of any of various materials, such as non-porous rubber, plastics, or the like, of relatively durable, continuous character, and may include or be provided with material of abrasive or other character capable of scraping or abrading the internal wall of the pipe to clean the same.

The portion of the coating or cover 12 between the ends of the body are provided with spaced apart openings or interstices 18, of any suitable shape, through which the material of the body is exposed and which are positioned so that there is no continuous path through which fluid may flow past the body when the body is in the pipeline with the coating or cover pressed into sealing engagement with the surrounding wall of the pipe. At the ends of the body, the coating or cover may be continuous to provide barriers against the fluids in the pipe in front of and behind the plug.

The plug or swipe will ordinarily be of a diameter somewhat larger than the internal diameter of the pipe, so that the plug will be compressed when inserted in the pipe to press the coating or cover 12 tightly against the surrounding wall of the pipe.

When so inserted in the pipe the plug or swipe may be propelled through the pipe by a pressure gradient between the fluid in front of and behind the plug, the plug being compressed longitudinally thereby to expand the body to more tightly engage the coating or cover with the pipe. It will also be apparent that the material of the body may be expanded through the openings 18 into engagement with the pipe, but the portions of the body located between the openings are protected against wear or damage due to contact with the pipe, so that there is no danger of leakage of fluid past the plug.

A somewhat different form of the invention is illustrated in FIGURES 2 and 4, wherein the body 10' is of the same character as that previously described, the coating or cover 12' being formed of strip-like material applied in reversely wound, overlapping spirals adhered to or coated on the body to form between them openings or interstices 18′ similar to the openings 18 and similarly positioned. Such spirals may be formed of flexible but relatively impressible material such as rubber or plastics, and due to the spiral arrangement the spiral strips may expand in diameter as the body is compressed longitudinally.

In the form of the invention illustrated in FIGURES 2 and 4, the ends of the body are covered by a continuous coating or cover as shown at 14′ and 16′ serving the same purpose as the end coating or cover portion 14 and 16 previously described.

The plug or swipe of FIGURES 2 and 4 is used in the same manner as the plug of FIGURES 1 and 3, previously described. Due to the reversely wound spiral arrangement of the strip-like coating or cover 12′, unwinding of the same due to tearing or wear is effectively prevented, so that the coating or cover is prevented from becoming detached from the body while serving to prevent the formation of any continuous flow path through which fluid could flow past the body.

It will thus be seen that the invention constructed as described above provides a pipeline plug or swipe of durable, wear resisting character, which is of economical construction, and which is designed to provide a fluid tight seal between fluids which are to be transmitted through a pipeline.

The invention is disclosed herein in connection with particular embodiments of the same which are intended by way of illustration only, it being evident that various modifications can be made in the structure of the plug or swipe within the spirit of the invention and the scope of the appended claims.

Having thus clearly shown and described the invention, what is claimed as new and desired to secure by Letters Patent, is:

1. In a pipeline swipe adapted to be propelled through a pipe by a pressure gradient
    a cylindrical body formed of resilient material, and
    a covering for said body having portions extending continuously about the periphery of the body to form a seal between the body and the surrounding wall of a pipe, said covering having spaced apart openings through which the body may expand into contact with the pipe upon longitudinal compression of the body.

2. A pipeline swipe in accordance with claim 1, wherein said covering is formed of strip material disposed in oppositely wound spiral relation about the body.

3. A pipeline swipe in accordance with claim 1, wherein said covering takes the form of a coating applied in a liquid state to the body.

4. A pipeline swipe in accordance with claim 1, wherein said body is moulded of a foamed plastic material.

5. A pipeline swipe in accordance with claim 1, wherein said covering completely covers the rear end of the body.

6. A pipeline swipe in accordance with claim 1, wherein said covering includes an abrasive material positioned for engagement with the surrounding wall of the pipe.

References Cited
UNITED STATES PATENTS
3,204,274   9/1965   Knapp _____ 15—104.06

EDWARD L. ROBERTS, *Primary Examiner.*